(12) United States Patent
Ebersole, Jr.

(10) Patent No.: US 6,980,229 B1
(45) Date of Patent: Dec. 27, 2005

(54) SYSTEM FOR PRECISE ROTATIONAL AND POSITIONAL TRACKING

(76) Inventor: John F. Ebersole, Jr., 3 Saratoga Ct., Bedford, NH (US) 03110

( * ) Notice: Subject to any disclaimer, the term of this patent is extended or adjusted under 35 U.S.C. 154(b) by 588 days.

(21) Appl. No.: 10/198,583

(22) Filed: Jul. 18, 2002

Related U.S. Application Data

(60) Provisional application No. 60/329,852, filed on Oct. 16, 2001.

(51) Int. Cl.[7] .............................................. H04N 5/225
(52) U.S. Cl. .................. 348/169; 382/210; 356/139.03
(58) Field of Search ................. 348/169, 87, 61, 348/76; 356/139.03; 382/103, 162, 163, 382/210; 702/153; 347/232; 378/21

(56) References Cited

U.S. PATENT DOCUMENTS

| | | | | |
|---|---|---|---|---|
| 5,199,054 A | * | 3/1993 | Adams et al. | ................. 378/21 |
| 5,294,993 A | * | 3/1994 | Sable | .......................... 347/232 |
| 5,850,472 A | * | 12/1998 | Alston et al. | ................ 382/162 |
| 5,940,537 A | * | 8/1999 | Regen et al. | ................ 382/210 |
| 6,362,875 B1 | * | 3/2002 | Burkley | ................. 356/139.03 |

* cited by examiner

*Primary Examiner*—Gims Philippe
(74) *Attorney, Agent, or Firm*—Brian M. Dingman; Mirick, O'Connell, DeMallie & Lougee, LLP (57) ABSTRACT

A system for tracking a movable structure, comprising: at least one fiducial; and at least one video camera; wherein either the camera or the fiducial is mounted on the movable structure, so that the camera can capture an image of the fiducial as the structure moves. The image from the video camera is captured. From this, the heading of the movable structure is resolved.

15 Claims, 7 Drawing Sheets

SYSTEM FOR PRECISE ROTATIONAL AND POSITIONAL TRACKING

CROSS REFERENCE TO RELATED APPLICATION

This application claims priority of Provisional patent application 60/329,852 filed Oct. 16, 2001.

FIELD OF THE INVENTION

This invention relates to the fields of position tracking, high accuracy calibration of large, movable objects, calibration, vehicle operation testing, vehicle operation training, and augmented reality (AR).

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

There are publicly known techniques whereby one or fiducials (markers that can be used to reference off of) are tracked by cameras in order to determine the pointing angle (roll, pitch, yaw) of the camera. What is different about this application is that it is done to very high precision, low latency, high speed (60 Hz), in AR (augmented reality), with high quality fiducials, and by using a specific technique that achieves all three. While the capabilities are great, the tradeoff is that the system has special requirements to operate most effectively, including the special fiducials that are pointed at the test platform, cameras, and a platform to be tested whose base is stationary.

SUMMARY OF THE INVENTION

A purpose of the invention is to allow testing, training, and calibration of vehicle or movable structure control systems in the field via the attachment of a minimal amount of extra equipment to the movable structure and the operating environment while still providing extremely high accuracy in the tracking information gathered.

This invention features a system and method to track the rotational position (roll, pitch, and yaw angles) of a vehicle, vehicle component, or movable attachment to a fixed structure with extreme accuracy. Positional tracking (as opposed to purely angular) is also accomplished by the invention. The system uses one or more cameras and one or more emissive fiducials that provide the 'anchor' to the real world. Normally, the camera(s), mirrors, and optics are non-moving. However, an improvement to that would be to rotate the camera(s), mirrors, and/or optics precisely known amounts to achieve larger areas of tracking coverage. This image information is processed on a PC that contains a high-speed image capture and processing board. The system may also include an augmented reality (AR) display for the operator. The system may be used for calibration, verification, or independent testing of the hardware and software used to control the movable component (including manual or human controllers) of any vehicle or movable attachment to a fixed emplacement. It may also be used to test or train the human operator of such a movable component or attachment. Furthermore, the system may also be used to test the combined effectiveness of the human, mechanical, and software components of a movable component of a vehicle or structure.

DETAILED DESCRIPTION OF THE PREFERRED EMBODIMENTS OF THE INVENTION

Figure 4:
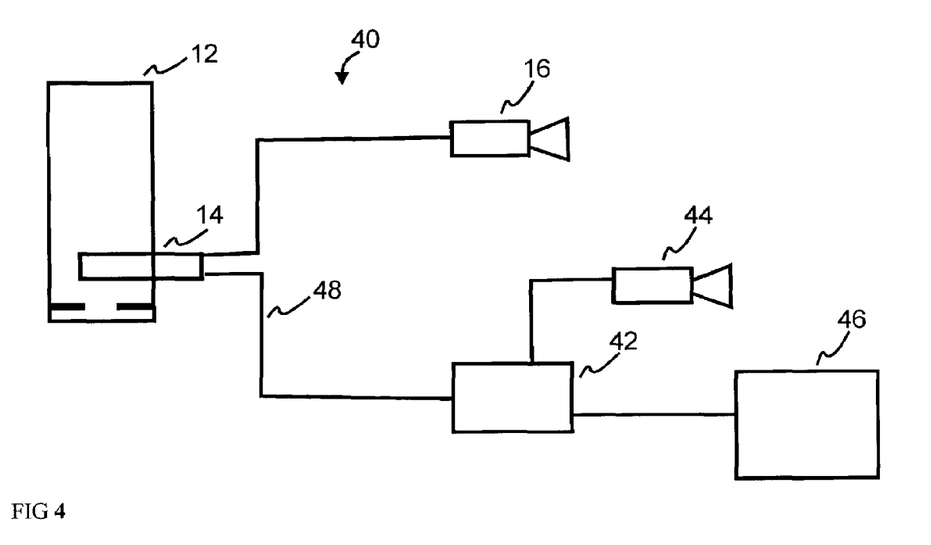
FIG. 4 is a block diagram of another alternative embodiment using externally mixed AR from a non-system camera.
Figure 5:
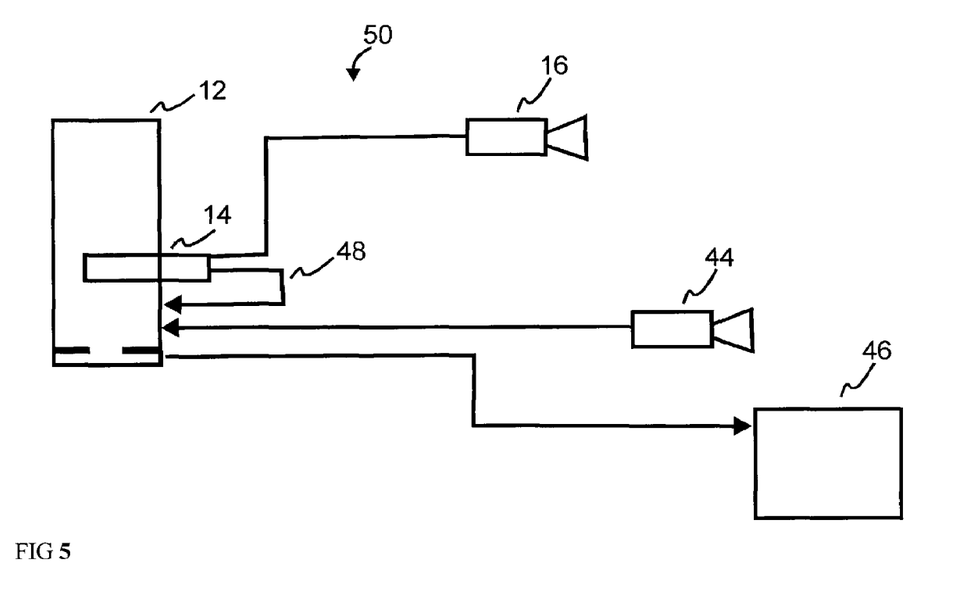
FIG. 5 is a block diagram of yet another alternative embodiment using internally mixed AR from a non-system camera.

The invention consists of two major component groups: a collection of hardware for tracking and display, and a number of software components for the collection of data, interpretation of camera images, augmented reality (AR) display to the user, and control by a test administrator. The hardware system 10, FIG. 1, consists minimally of a computer 12, high-speed video camera 16, high-speed image capture board 14, and one or more actively emissive fiducials 18. If the system 20, FIG. 2 will be providing feedback to a human test subject or operator for the system being tested, then the addition of a video display device 22 is also required. The software components minimally contain code for the control of the video capture board 14, translation of the incoming image data into tracking information, and if needed, data collection for evaluation. Software for image generation is also needed if there is an output video display 22 present (for a human operator or test subject). If desired, an external control computer 32, FIG. 3 may be used to control the use of the invention. Using the external computer 32 allows the processing computer 12 to be dedicated to processing the information. If a higher quality real world view is desired, and separate camera 44, FIGS. 4 and 5 may be used, so long as its center axis is aligned with the tracking camera 16. The image of the real world taken by the non-tracking-system camera 44 may be mixed with the computer-generated imagery 48 by using either the method 40, FIG. 4 wherein the two image streams are mixed using an external video mixer 42, or by the method 50, FIG. 5 wherein the two image streams are mixed internally on the computer 12.

Overview of system operation. At $60^{th}$-of-a-second intervals, the camera captures an image that is used to determine the current heading and position of the test platform (this is detailed below). This heading may either be saved, or may optionally be used in combination with an external test profile to place a computer-generated image into the scene, which is then displayed to the human operator. The tracking data for the entire test is collected and processed in accordance with the needs of the specific application for which it is being used.

Gathering of tracking information. The following process is used to gather tracking information. First, the high-speed camera takes a snapshot of the world. Using a custom image-processing algorithm (the Low Resolution Grid Method, described below), the fiducials are identified in the captured image. Next, based upon the previous frames' fiducial positions, the system decides which physical fiducial corresponds to each fiducial present in the image. Using the known position (not rotation) of the test platform, and the observed location of the fiducials, the algorithm calculates the new heading of the test platform. Calculation of the heading uses inverse-projection techniques, wherein the algorithm takes the known variables (positions of the test platform and fiducials), and back solves rotation and projection equations to determine the heading that could produce an image that contains the fiducials as they are present in the image. This process is repeated once each frame to calculate and save the test platform's heading (roll, pitch, and yaw) at that instant in time.

Note that while the embodiment described here assumes that the position (not rotation) of the test platform does not change relative to the platform itself, this is not required. An additional linear tracking system can be added to the test platform to provide the x, y, & z location of the test platform's reference position. This tracking system would preferably be mounted on a part of the test platform that is separate from the movable portion of the test platform whose heading is being measured by the system. Alternatively, it is possible to perform location tracking based on the known positions of the fiducials. The degree of accuracy of the measurement is largely dependant on how the fiducials are laid out in the field. The less collinear they are, the better the positional accuracy.

Detailed description of camera synchronization to image capture board. Because the captured frame data is used for both position tracking calculations and performance evaluation, extreme attention must be paid to timing and synchronization details. Locking the frame synchronization signal of the cameras to the vertical refresh signal of the VGA output of the image capture & processing board in the PC does this. This hardware synchronization insures that each frame of data being processed by the image capture board is linked to a particular instant in time. This is especially important with the optional addition of a human operator display, or multiple cameras being used for image capture and tracking data. (detailed below).

Detailed description of Low Resolution Grid Method (LRGM). Fiducial identification and calculation of the centroid of each fiducial is extracted from the captured image data using a process named the "Low Resolution Grid Method." In this algorithm, the captured video frame is broken into a grid of square cells containing a fixed number of pixels. (Example: a 640×480 image capture may be broken down into a mesh of 40×30 cells which each contain 256 pixels in a 16×16 square). For each 16×16 pixel cell, an energy scalar and x, y cell centroid is calculated. The energy scalar is the simple sum of the brightness of all pixels in that cell. The centroid is the weighted average of each pixel and its position, thus calculating the brightness "center of mass" of the cell. Once all the cells have had their energy calculated, each cell is checked in turn to see if its energy scalar is above a certain threshold. If the threshold value is chosen properly, any cell whose threshold exceeds this value is certain to either contain the centroid of a fiducial, or border on a cell that contains the centroid of a fiducial.

Next a centroid for this cell and its eight adjacent cells is calculated using a linear summation of all of their scalar energies and centroid locations, thereby calculating a centroid for all nine cells. If this centroid summation of the nine cells lies inside the cell at the center of this group of nine cells, then this central cell is the centroid location of a fiducial. If not, then the cell in which the centroid summation lies is used as the center cell for a new centroid summation made up from it and the eight cells that surround its edges. In this case, the new (or second) centroid summation is guaranteed to be the fiducial centroid, so long as the size of the fiducial in the image is less than two cells tall.

For this method to function correctly, all fiducials must be placed so as to be at least 3 'LRGM cells' apart (in the camera's view) either by moving the fiducials far enough apart, or by increasing the number of cells present in the screen capture image (i.e., by decreasing the number of pixels in each cell). This ensures that no one cell will be involved in two different fiducial centroid calculations.

A possible modification to this algorithm involved the comparison of each pixel's value to a threshold value before it is added into the centroid calculation. This additional step increases the signal-to-noise ratio of the image at the cost of additional computational complexity in the cell's centroid calculation. This threshold can be chosen as either a fixed value, or may be dynamically calculated for each cell based upon some function of the energy scalar present in that cell in previous frames. In the example embodiment, the average pixel scalar energy for the last frame in which that cell was not involved in a fiducial centroid calculation is multiplied by 1.2 and used as this threshold value.

The LRGM algorithm is very fast, and was chosen for that reason. The tradeoff is that it assumes that the image is very black except for the fiducials. To achieve this, the actively emissive fiducials were used, and designed to be very bright, and the camera irises were stopped down until almost everything but the fiducials was black. Additionally, linear cameras should be used, since the LRGM algorithm linearly adds energy levels together to produce its results. A non-linear camera can be used, but it would have to be compensated for in software, which would significantly reduce the speed of the algorithm.

Detailed Description of Fiducials.

Figure 7:
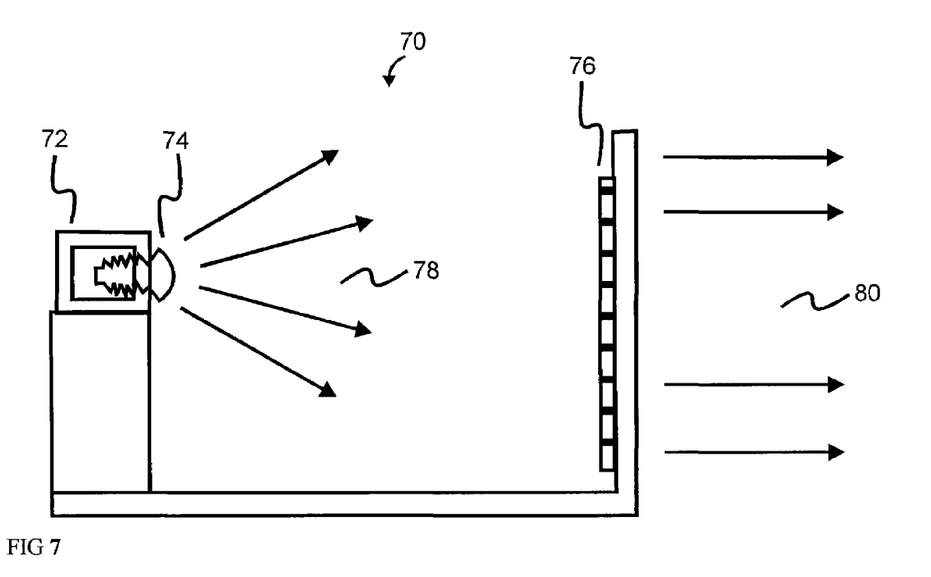
FIG. 7 is a schematic, partial diagram of the minimum preferred fiducial embodiment for the invention.

The anchor to the real world is provided by actively emissive fiducials, one of which is shown in FIG. 7. These powered targets are then identified by the above LRGM in raw image data provided by the cameras. In order to provide a consistently shaped, brightly lit target, a Fresnel lens 76 is used to direct the light 78 from an incandescent bulb 74 held in fixture 72 in the direction 80 of the test platform (with the system camera(s) mounted upon it). Each fiducial may be hooked up to an external, fixed power source, or be independently powered by batteries or a portable generator. Further enhancements may include a precipitation/light shield (rain and reflections on the Fresnel lens and light bulb may be detrimental in certain circumstances), and air holes in the precipitation/light shield if temperature is a concern. For optimum directionality (to make them maximally parallel) of the light rays coming out the Fresnel lens, the filament of the light bulb should be placed at the focal point of the Fresnel lens. Given a maximum diameter Fresnel lens to use, in order to achieve maximum brightness possible, a Fresnel lens with the shortest focal length available is the best one, since the light bulb's filament will be placed closer to the lens (in order to have the filament at the focal point), thus allowing the lens to engulf more of the "sphere" of light emitting from the filament. For example, the shorter the focal length of the lens (thus the closer the filament gets to the lens), the closer the lens gets to capturing 50% of the light rays emitting from the filament, since a sphere drawn with the filament at the center of it will become approximately cut in half by the plane of the Fresnel lens.

Detailed Description of B&W, High Speed, Linear Camera.

The camera(s) used in the best mode are different than typical CCD cameras in the following ways:

1) They are higher speed, able to capture complete (non-interlaced) 640×480×8 bit frames at a minimum of 120 Hz. 2) They are linear (with a gamma=1.0 response) which, while non-ideal for NTSC display (NTSC has a gamma of around 0.45–0.5), is much better for fiducial identification and image processing. This feature alone enhances the LRGM significantly. 3) They are black and white only, which simplifies the image processing and helps to avoid issues with signal-to-noise ratios and digital to analog conversion problems which are present in NTSC interlaced color video images (a.k.a., Television). (4) They send their data digitally, which means no jitter or loss of information, thereby vastly improving noise characteristics when compared to ordinary NTSC cameras.

Data Gathering and Output.

Data gathering is done once the test platform heading (roll, pitch, and yaw) has been determined. The measured positions may then be compared to desired/optimal positions, the relative heading of a simulated target or whatever else is chosen as a reference against which to evaluate.

System Setup and Calibration.

Careful system calibration is very important for the creation of high system accuracy. Fiducial positions relative to the camera(s) must be carefully measured. Either measuring the real-world positions of all fiducials and cameras very accurately, or using the camera as a reference point and measuring the positions of the fiducials relative to it may accomplish this. Optical distortion of the lens must also be measured and accounted for in the algorithm. This is done in the best mode embodiment by creating a calibration table that converts observed fiducial locations in the camera's optics into idealized locations that the calibration table has corrected.

Once the fiducials are accurately measured, minor residual errors in their locations can be corrected for in software by the following procedure: (1) using two fiducials believed to be accurately known, move the camera to place the two fiducials onto the field of view (FOV) of the camera and calculate a FOV of the camera that would correspond to the real world locations of the fiducials. (2) Next, keep one of the previously known fiducials in the FOV and rotate the camera until an additional fiducial is in the FOV. (3) If the new fiducial in the image doesn't appear in the expected location, modify the stored coordinates of the fiducial to line up with what is seen. (4) Repeat steps 2 and 3 until all fiducials are corrected. (5) A final check on the FOV can be done if there are fiducials 360 degrees around the camera by rotating the camera 180 degrees clockwise and then 180 degrees counterclockwise and determine whether both directions report the same rotation (since +180 and −180 degree rotations should be equal); if not, scale the FOV of the camera until the two numbers match. Assuming no camera distortion, this method will produce calibration results on the order of the noise level or less, especially if results are averaged.

To calibrate out the camera distortion, one method would be to create and use a standard calibration map. To automatically set the calibration map, (1) determine the approximate FOV of the camera (as outlined in the above fiducial calibration method), (2) set the map to have a linear profile assuming this FOV, (3) look at any two fiducials and determine their locations on the image and their believed real world angular separation, (4) using the current calibration map and the on-image locations of the fiducials, compare the true angular separation with the calculated on-image angular separation, (5) adjust the map by adjusting the control points near both fiducials, and (6) move the camera system around (to move the images of the fiducials around on the image) and repeat steps 3–5 with the same fiducials until the fiducials have been properly calibrated across the whole screen and no more uncalibrated areas can be detected.

Optional Image Generation for Human Operator.

If there is a human operator as part of the test platform being evaluated, then image generation may be required to provide visual feedback to this person. A typical configuration would display the captured image from the camera overlaid with a computer-generated target or other visual feedback to the user. Since this displayed image is made up of the combination of real-world (from the camera) and simulated (from the computer) imagery, it is said to be an augmented reality (AR) display.

An example use for this would be during the evaluation of a human operated system for pointing a high-zoom camera at athletes during a sporting event. The human camera operator test subject would view the real world through the camera or a monitor, with a simulated moving target superimposed onto the scene. As the human operator attempts to keep the camera pointed toward the simulated target, the heading & elevation of the camera's point of aim would be measured and later compared to the simulated target's position at that time by the inventive system. Because of the synchronization, the position which the simulated target would have occupied in the real world, and where it was displayed to the human test subject, is known. Thus, where the camera was actually pointed can be compared to where it should have been pointed. This provides a measurement of the quality of the human subject's performance during that instant of the test. This can then be used to calculate measurements like "time on target" for the duration of the test, or for any instant during the test. Optionally, such a test's video images may be captured and replayed later for the test subject's and/or test evaluator's review or investigation.

Optional Additional Camera(s).

The system is not limited to the use of one camera at a time. If additional camera(s) are used, they will independently calculate the heading of whatever component they are attached to.

For example, consider the tracking of two independently pointed systems on one platform. One tracking system camera could be attached to a high-zoom camera, while a second could be attached to a directional microphone. Not only will the high-zoom camera's aiming point be tracked from frame to frame, but also the point of aim of the directional microphone. Another example would attach one camera to a computer-controlled high-zoom camera and another to the operator's sight (which is not physically linked to the high-zoom camera) used by the computer to aim the high-zoom camera. In this case, not only would the high-zoom camera's actual aimpoint be measured, but also the aimpoint of the sight that the operator is aiming with.

This would allow not only the testing of the human operator or the computer's aiming model separately, but also the combined system response of the human, optics, and computer aiming model.

Figure 3:
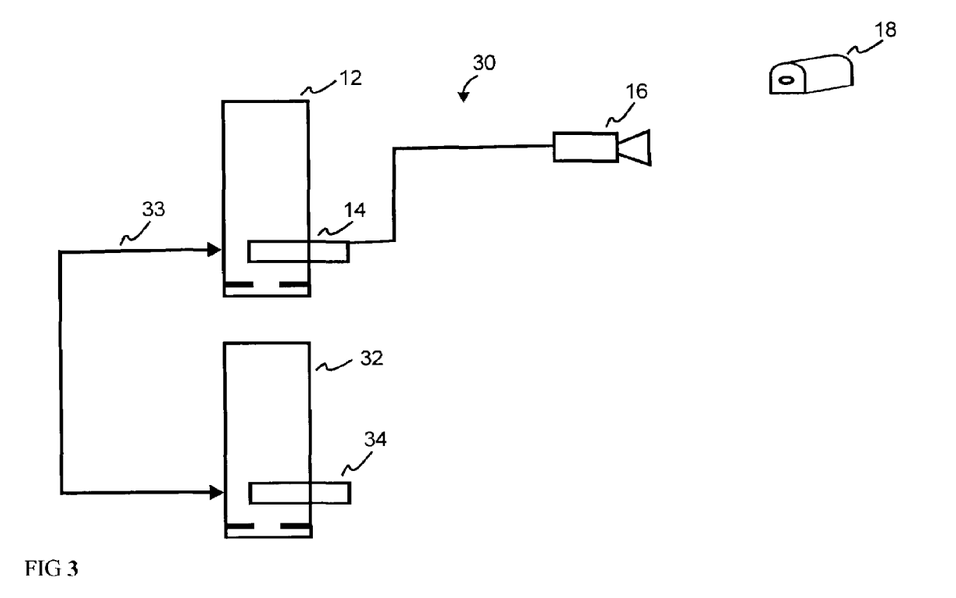
FIG. 3 is a block diagram of an alternative embodiment using an external control computer.

Optional External Control Station (FIG. 3).

Another optional addition is the use of an external control station PC 32. In this case, the test administration is done on a separate PC from the actual test execution and data measurement. This allows the test administrator to be at a different physical location than the test machine (which is typically installed onto the platform being tested). This also offers the advantage of minimizing the non test execution related activities of the test PC, helping to guarantee the time critical response needed for accurate tracking with this algorithm.

The external test control PC communicates with the test execution PC over standard ethernet using either a physical ethernet cable connection or wireless ethernet signal hardware 33. The test control PC runs a graphical user interface (GUI), which submits commands to the test execution PC over the ethernet network connection. The test administration PC also reports on test progress and/or completion to the test control PC over the same network connection. The communication is done using the standard TCP/IP network communication protocol.

An example embodiment: testing a human operated high-zoom camera and directional microphone for filming, and listening to athletes from long range at a sporting event.

Figure 1:
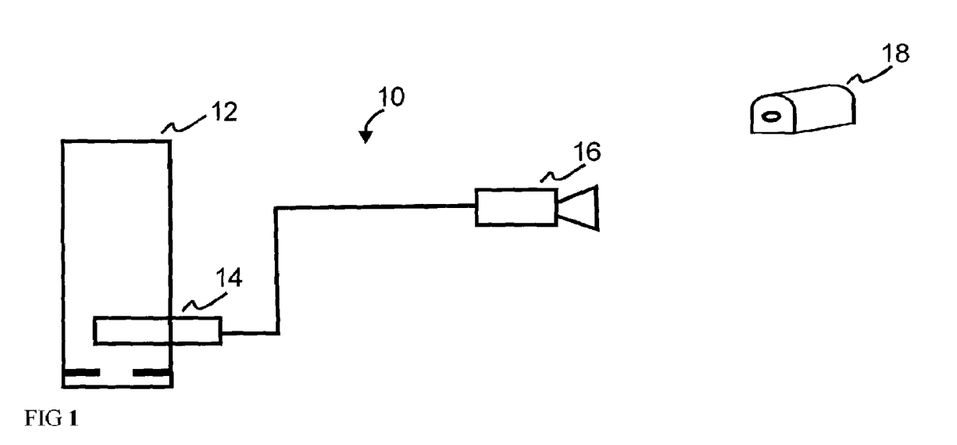
FIG. 1 is a block diagram of the minimum preferred embodiment of the invention.
Figure 2:
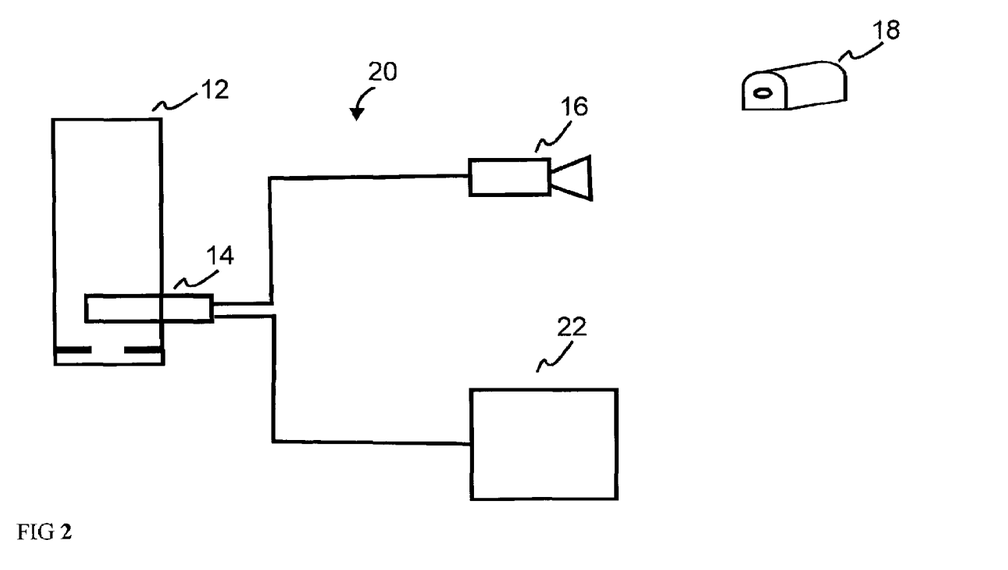
FIG. 2 is a block diagram of the minimum preferred embodiment of the invention when a video display is present.

The hardware for this invention consists minimally of a computer, a high-speed digital camera, and a minimum of one fiducial, as diagramed in FIG. 1. Other embodiments include the following. 1) Additional fiducials to increase the system's field of view. 2) The use of an AR display to provide user with targets or other feedback, using either see-through or video-based AR. 3) The use of additional cameras to track multiple movable objects or the simultaneous tracking of user aim and attachment aim. 4) The use of an external control computer 32 (FIG. 3). 5) The use of an additional camera 44 and video mixer 42 to provide a color or black and white real-world image to augment with a video-based AR display 46 (FIG. 4 for externally mixed, FIG. 5 for internally mixed by computer). Note that black and white AR mixing may occur on the video capture board.

Figure 6:
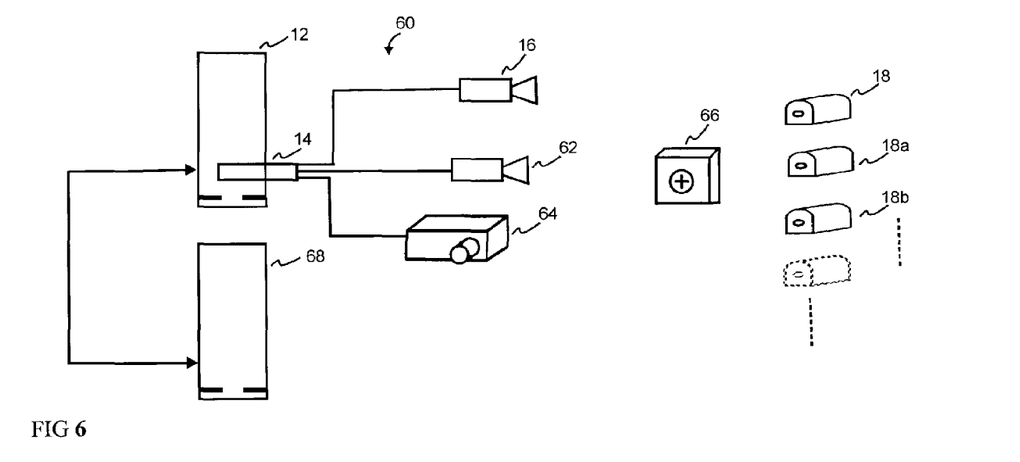
FIG. 6 is a block diagram of the best mode of practicing the invention.

FIG. 6 illustrates the preferred embodiment of the system 60 of the invention that includes many of these features: multiple fiducials 18, 18*a*, 18*b* . . . , multiple cameras 16, 62, video see-through AR display 64, and external control computer 68. This configuration was used for the reduction to practice.

In the preferred embodiment, there are one or more powered (emissive) fiducials. However, any type of fiducial that can be tracked by a video camera can be used, including passive fiducials. For example, the fiducials could use external sources of light such as the sun. Plastic 12×12 inch fluorescent orange fiducials (because it is a color not commonly found in nature), produce sufficient contrast to be tracked. However, these fiducials provide lower accuracy and higher noise level than in the preferred powered fiducials. Daylight or other lighting techniques are needed, but this arrangement provides the advantages of low cost, and low maintenance. Note that in this case color cameras are required, since the fiducials are colored, and thus not discernable from the background with a grayscale camera. This color camera requirement might be obviated with highly reflective fiducials or other surfaces of a type which would not normally otherwise be seen in the view of the camera.

In this case, the low-resolution grid method could not be used directly, but would instead need to be slightly modified to in software filter out colors that did not match, and then using brightness to again determine a mathematical center. Thus, the math of the algorithm is essentially the same, but the determination of which pixels to include in the calculation is different.

An embodiment of this invention that was actually reduced to practice used the hardware and software documented in Table 1. (Note that this embodiment used optional hardware: a second camera, power supply, video-based AR display, and set of camera cabling.)

TABLE 1

Equipment List.

| Item | Brand Name |
| --- | --- |
| 6710 high speed camera (2) | Pulnix |
| Fast Image DSP board | Alacron |
| PC (dual CPU) | Dell |
| Monocular Display (color) | Virtual Research |
| Cable, FI to camera (2) | Custom |
| Cable, PC RS-232 to camera (2) | Custom |
| Lens, (2) | Pentax |
| Power supply (2) | Pulnix |
| Surge Protector, 6-way | Dynatech |
| Custom made parts & assembly | Plastics Supply Inc., John Bernard, Inc. |
| Monitor, high resolution | Dell |
| Monitor, VGA | Dell |
| Optional test control PC | Dell |
| Optional ethernet cable (crossover) | Cables To Go |
| Optional ethernet card (2) | 3Com |

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A system for tracking a movable structure, comprising:
   at least one actively emissive fiducial;
   at least one video camera;
   wherein either the camera or the fiducial is mounted on the movable structure, so that the camera can capture an image of the fiducial as the structure moves;
   means for capturing the image from the video camera;
   means for determining the location of the fiducial in the captured image, comprising means for resolving the energy received from the active fiducial separately in a plurality of separate areas of a captured video frame, means for comparing the resolved energy to a predetermined energy threshold to find areas with energies above the threshold, and means for resolving the centroid of a larger area of the captured video frame comprised of a separate area with an energy above the threshold and a plurality of contiguous separate areas; and
   means, responsive to the means for determining, for resolving the heading of the movable structure.

2. The system of claim 1 further comprising means, responsive to the means for determining, for also determining the location of the movable structure.

3. The system of claim 1 wherein the means for resolving the heading comprises means for comparing captured images over time.

4. The system of claim 1 further comprising means for correcting the captured image for lens distortion.

5. The system of claim 1 wherein the camera is linear.

6. The system of claim 1 further comprising a video display for displaying an image.

7. The system of claim 6 further comprising means for creating computer generated graphics.

8. The system of claim 7 further comprising means for mixing the captured video image and the computer generated graphics, and displaying them together on the video display as an augmented reality image.

9. The system of claim 8 wherein the displayed captured image is taken with a second video camera.

10. The system of claim 1 wherein the fiducial comprises a lamp and a Fresnel lens for capturing and focusing light from the lamp.

11. The system of claim 10 wherein the fiducial further comprises an enclosure for enclosing the lamp, and holding and shading the lens.

12. The system of claim 10 wherein the lamp is directional.

13. The system of claim 10 wherein the lamp filament is located at the focal point of the lens.

14. A system for tracking a movable structure, comprising:
- at least one actively emissive fiducial;
- at least one linear video camera;
- wherein either the camera or the fiducial is mounted on the movable structure, so that the camera can capture an image of the fiducial as the structure moves;
- means for capturing the image from the video camera;
- means for determining the location of the fiducial in the captured image, comprising means for resolving the energy received from the active fiducial separately in a plurality of separate areas of a captured video frame, means for comparing the resolved energy to a predetermined energy threshold to find areas with energies above the threshold, and means for resolving the centroid of a larger area of the captured video frame comprised of a separate area with an energy above the threshold and a plurality of contiguous separate areas; and
- means, responsive to the means for determining, for resolving the heading of the movable structure, the means for resolving the heading comprising means for comparing captured images over time.

15. A system for tracking a movable structure, comprising:
- at least one actively emissive fiducial;
- at least one linear video camera;
- wherein either the camera or the fiducial is mounted on the movable structure, so that the camera can capture an image of the fiducial as the structure moves;
- means for capturing the image from the video camera;
- means for determining the location of the fiducial in the captured image, comprising means for resolving the energy received from the active fiducial separately in a plurality of separate areas of a captured video frame, means for comparing the resolved energy to a predetermined energy threshold to find areas with energies above the threshold, and means for resolving the centroid of a larger area of the captured video frame comprised of a separate area with an energy above the threshold and a plurality of contiguous separate areas;
- means, responsive to the means for determining, for resolving the heading of the movable structure, the means for resolving the heading comprising means for comparing captured images over time;
- a video display for displaying an image;
- means for creating computer generated graphics; and
- means for mixing the captured video image and the computer generated graphics, and displaying them together on the video display as an augmented reality image.

* * * * *